United States Patent
Koller et al.

(10) Patent No.: US 6,831,797 B2
(45) Date of Patent: Dec. 14, 2004

(54) PROGRAMMABLE WRITE EQUALIZATION CIRCUIT

(75) Inventors: Justin J. Koller, Wheat Ridge, CO (US); Ben Sembera, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 252 days.

(21) Appl. No.: 09/953,060

(22) Filed: Sep. 13, 2001

(65) Prior Publication Data

US 2003/0048564 A1 Mar. 13, 2003

(51) Int. Cl.$^7$ .......................... G11B 20/10; G11B 5/035
(52) U.S. Cl. ............................ 360/41; 360/65; 360/68
(58) Field of Search ........................ 360/65, 46, 51, 360/40, 68, 41, 45

(56) References Cited

U.S. PATENT DOCUMENTS 5,872,665 A    2/1999  Millican et al.
6,621,648 B2 * 9/2003  Elliott et al. .................. 360/45

\* cited by examiner

*Primary Examiner*—Alan T. Faber
(74) *Attorney, Agent, or Firm*—Morrison & Foerster LLP

(57) ABSTRACT

A programmable write equalization circuit includes a first digital clock that is used as a reference to indicate data rate, a second digital clock used to indicate write equalization quantization, a look-up table used to store waveforms used in equalizing the input from the first digital clock domain to the second digital clock domain, a counter used to indicate the number of bits within the look-up table that are to be used for each translation, a polarity detector used to detect the current state of the input data, a non-return-to-zero (NRZ) filter used to indicate the placement of data transitions and non-transitions, and a software interface including programmable registers to control each one of the parameters within the equalization circuit.

22 Claims, 5 Drawing Sheets

PROGRAMMABLE WRITE EQUALIZATION CIRCUIT

BACKGROUND OF THE INVENTION

This invention relates generally to magnetic data storage devices such as magnetic tape drives and more specifically to the programmable adjustment of equalization in a digital write signal.

Write equalization is commonly used in magnetic storage devices to pre-compensate for distortion in the transmission path of a magnetic data storage device. In magnetic recording, as well as in other communications and transmission-related fields, various forms of optimization and adaptation are applied to transmitted or written data that can improve the ability to recover the original data upon reception or reading. A typical magnetic storage system including a write equalization circuit 10 is shown below in FIG. 1.

Referring now to FIG. 1, input data is received on input data line 12 and pre-distorted by write optimization circuit 14. The output signal of the write optimization circuit is buffered by write buffer 16 and fed to the write head 18. The pre-distorted and buffered input signal is transferred to magnetic tape 20 and read by read head 22, buffered by read buffer 24 and converted to output data on output data line 28 by read circuit 26.

Choosing an appropriate form of optimization is dependent upon a working knowledge of a given recording channel's many characteristics such as thermal noise, read and write head characteristics, type of media used, and many other factors. These characteristics can all change over time during the course of operation of such systems. If the equalization circuit is static as shown in FIG. 1, and conditions change, system performance will not be optimized until a new write equalization circuit or solution can be implemented.

What is desired, therefore, is the ability to program the write equalization circuitry to accommodate changes in the many characteristics of a magnetic recording system so that various forms of write equalization can be used and system performance can be continually optimized.

SUMMARY OF THE INVENTION

According to the present invention, a programmable write equalization circuit includes a first digital clock that is used as a reference to indicate data rate, a second digital clock used to indicate write equalization quantization, a look-up table used to store waveforms used in equalizing the input from the first digital clock domain to the second digital clock domain, a counter used to indicate the number of bits within the look-up table that are to be used for each translation, a polarity detector used to detect the current state of the input data, a non-return-to-zero (NRZ) filter used to indicate the placement of data transitions and non-transitions, and a software interface including programmable registers to control each one of the parameters within the equalization circuit. An integer ratio N relates the first and second clock rates wherein N is also the amount of quantization available to the equalization.

The parameters available to the circuit include the use of NRZ transformation of the data, the variable rate of the first and second clocks, the variable length of the programmable output data sequences, and the actual content of the output data sequences desired. The user of the programmable equalization circuit, who may be a product designer, researcher, or software programmer, can adjust these circuit parameters to attain a desirable output waveform to optimize the ability of a reading circuit to recover the original data after the waveform is transmitted and/or recorded through the media and media access sub-system including the read and write heads, tape medium, and other components shown in FIG. 1.

Desirable optimizations for the equalization circuit of the present invention may include the usage of Schneider write equalization, pulsed writing, pulsed writing with equalization, differential outputs using dual sequence tables, each used as a sequence source for one of the differential lines, differential pulsed waveforms, double-pulsed writing, along with various spacings of the equalization signals. While these are the most typical operations possible with the equalization circuit of the present invention, many variations of output signals are possible enabling the best possible optimization to be implemented, or adapted as needed in real time.

It is an advantage of the equalization circuit of the present invention that it can be entered into manufacturing before any of the storage system operating conditions are known, yet still be optimized once the operating conditions have been precisely specified.

It is an advantage of the present invention that it adds to the flexibility of product development and scheduling.

It is a further advantage of the present invention that the circuit is "adaptable" in that it can be continually re-optimized under external control as required by changing conditions in the data storage system.

The foregoing and other objects, features and advantages of the invention will become more readily apparent from the following detailed description of a preferred embodiment of the invention which proceeds with references to the accompanying drawings.

DETAILED DESCRIPTION

Figure 1:
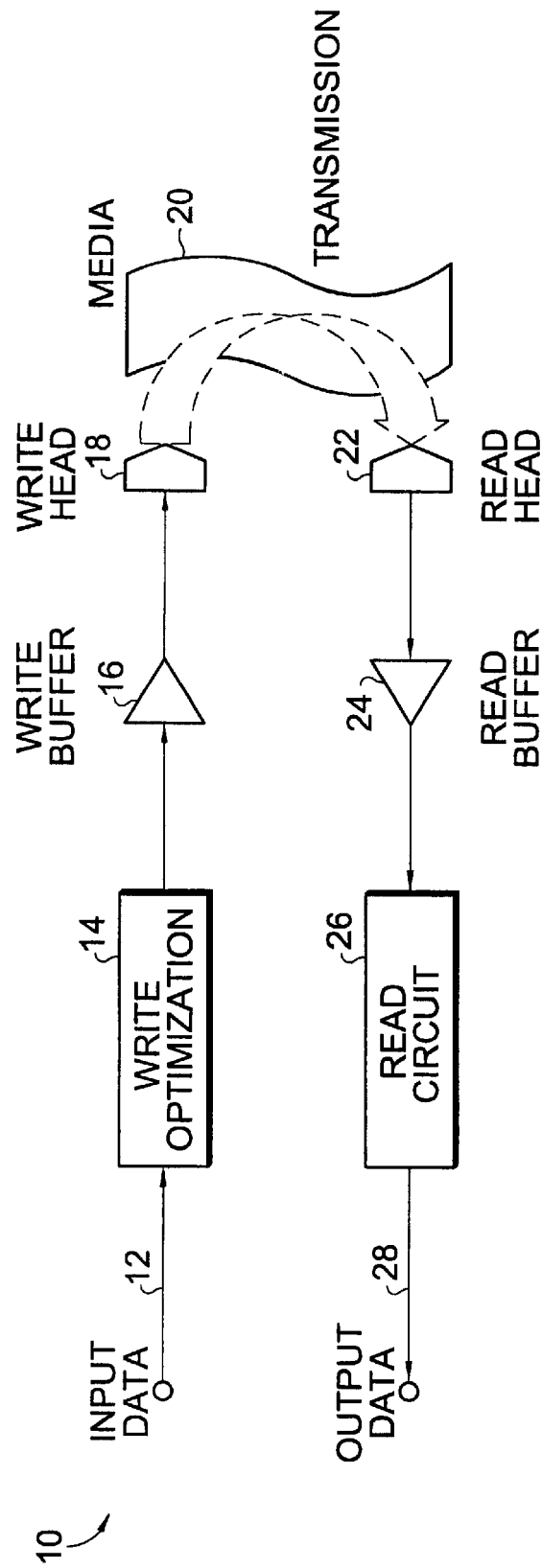
FIG. 1 is a block diagram of a prior art magnetic data storage system including a static write optimization circuit.
Figure 2:
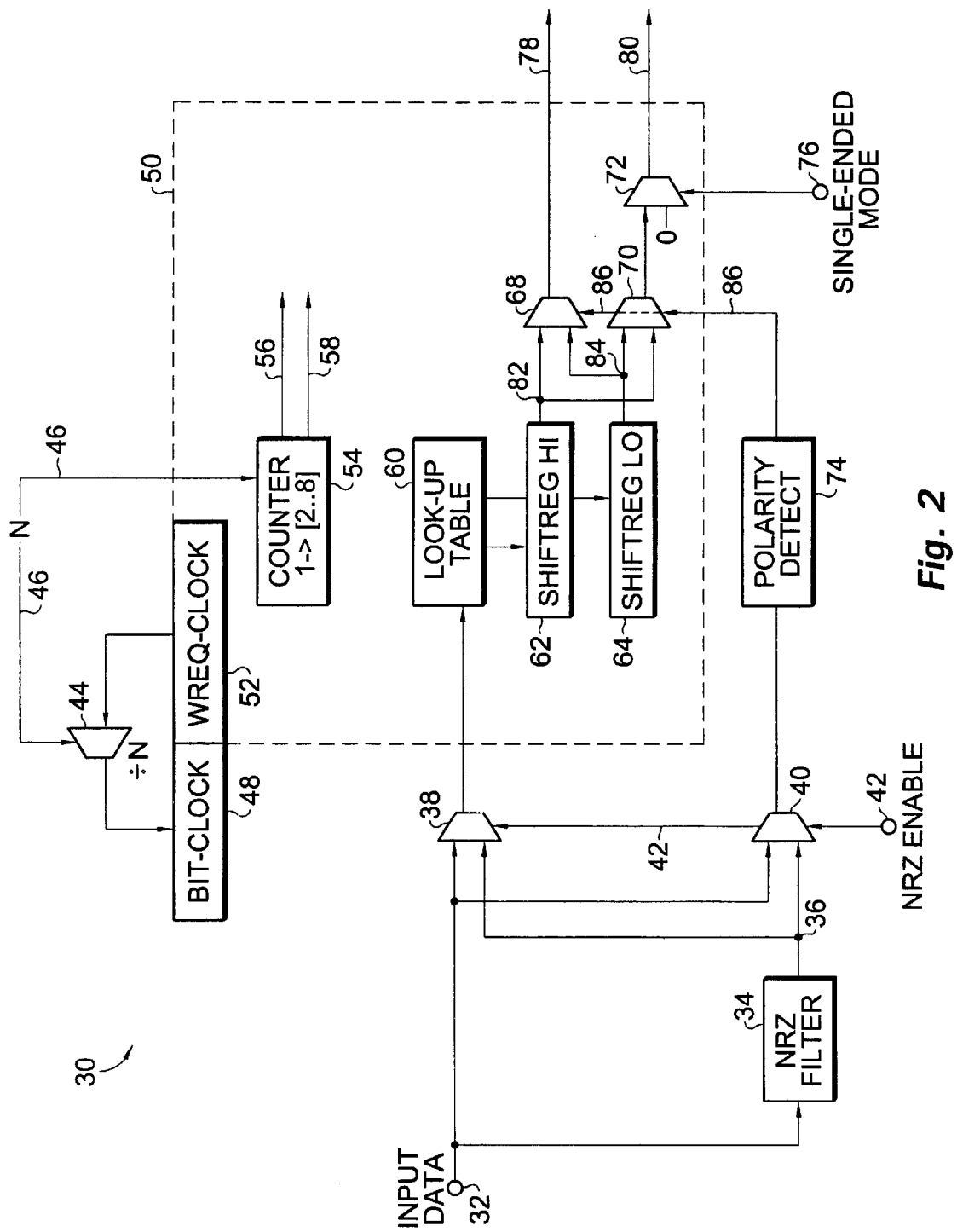
FIG. 2 is a block diagram of a programmable write equalization circuit according to the present invention including first and second digital clocks, a look-up table, a counter, a polarity detector, a non-return-to-zero (NRZ) filter, and a software interface including programmable registers.

Referring now to FIG. 2 a programmable write equalization circuit 30 includes a look-up table 60 for receiving input data and first and second outputs. Input data is received on node 32 and transferred to look-up table 60 through multiplexer 38. A first shift register 62 has an input coupled to the first output of look-up table 62 and an output for providing a first output data sequence at node 82. A second shift register 64 has an input coupled to the second output of look-up table 62 and an output for providing a second output data sequence at node 84. Equalization circuit 30 includes a first equalization circuit output at node 78 and a second equalization circuit output at node 80. An output switching circuit includes multiplexer switching circuitry for coupling the output of first shift register 62 to either or both of first and second equalization circuit outputs 78 and 80, and, similarly, multiplexer switching circuitry for coupling the output of the second shift register 64 to either or both of the first and second equalization circuit outputs 78 and 80. The multiplexer switching circuitry enables both differential and single-ended modes of operation.

The output multiplexer switching circuit includes a first multiplexer 68 has a first input coupled to the first shift register 62, a second input coupled to the second shift register 64, and an output forming the first equalization circuit output at node 78. A second multiplexer 70 has a first input coupled to the first shift register 62, a second input coupled to the second shift register 64, and an output. A third multiplexer 72 has a first input coupled to the output of the second multiplexer 70, a second input for receiving a logic zero signal, and an output forming the second equalization circuit output at node 80. First and second multiplexers 68 and 70 further include a switching input for receiving a single-ended mode control signal at node 76.

Programmable write equalization circuit 30 also includes a reference bit-clock 48, which is used to indicate a new bit at input data node 32 and a wreq-clock 52 (wreq=write equalization), which is used to drive shift registers 62 and 64 (one output bit for each cycle of wreq-clock 52). The wreq-clock 52 is a frequency multiplied reference clock signal and has a frequency of N times the reference clock signal, wherein N is an integer greater than or equal to two, and less than or equal to eight.

A counter 54 has an input for receiving the frequency multiplied reference clock signal and a first output 56 coupled to the first shift register 62 and a second output 58 coupled to the second shift register 64. The counter provides a reload signal to shift registers 62 and 64 after a count to the pre-selected integer N has been reached.

Programmable write equalization circuit 30 also includes an NRZ filter circuit to allow pulse-mode and double-pulse mode operation. The NRZ filter circuit includes an NRZ filter 34 having an input for receiving the input data on node 32 and an output at node 36. A first multiplexer 38 has a first input for receiving the input data at node 32, a second input coupled to the output of the NRZ filter 34 at node 36, and an output coupled to look-up table 60. A second multiplexer 40 has a first input for receiving the input data at node 32 and a second input coupled to the output of NRZ filter 34 at node 36, and an output coupled to the output switching circuitry through polarity detect circuit 74. First and second multiplexers 38 and 40 each further comprise a switching input for receiving an NRZ enable control signal at node 42.

Programmable write equalization circuit 30 also includes a polarity detect circuit 74 having an input coupled to the NRZ circuit 34, through multiplexer 40, and an output coupled to the output multiplexer switching circuit at multiplexer 70. The NRZ filter 34 removes "plus" (1) or "minus" (0) information and replaces it with "transition" (1) or "non-transition" (0) information. The polarity detect circuit 74 reinstates this information. A "transition" is defined as the input data changing from a 1 to a 0, or from a 0 to a 1, given two consecutive clock cycles. A "non-transition" is defined as no change in the input data, implying a 0 followed by a 0, or a 1 followed by a 1, given two consecutive clock cycles.

In operation, a programmable write equalization circuit generates a first output data sequence having a granularity N times greater than a system clock signal, wherein N is an integer greater than one, generates a second output data sequence having a granularity N times greater than the system clock signal, and generates a first and second system output data sequences. The data sequences at the outputs are either equal to the first output data sequence, the second output data sequence, or a differential (subtraction) combination of both sequences. The first and second system output data sequences form a single-ended output signal, a differential output signal, a pulsed-mode output signal, or a variant of the output signal.

Figure 3:
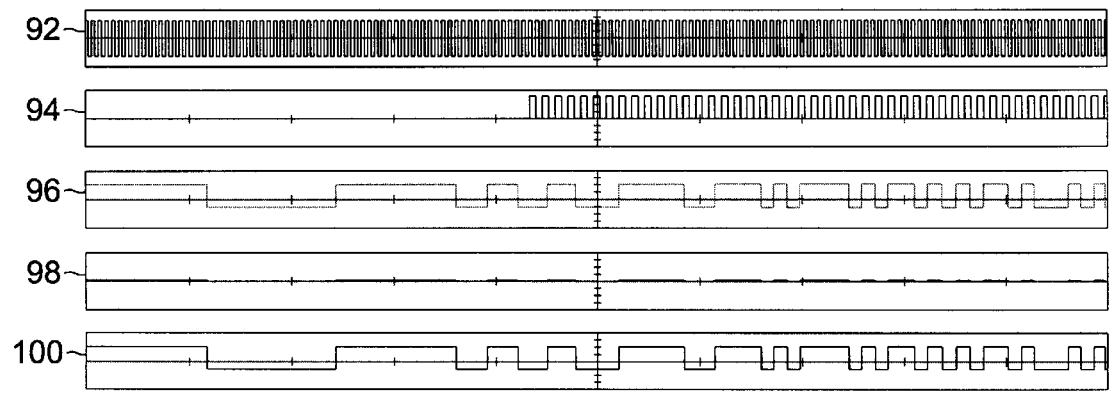
FIG. 3 is a timing diagram from an oscilloscope of various equalization circuit nodes, showing a single-ended output signal, with no write equalization.

FIG. 3 is a timing diagram from an oscilloscope of various equalization circuit nodes, showing a single-ended output signal, with no write equalization in which trace 92 is the system or wreq-clock, trace 94 is the bit-clock, trace 96 is the high data output, trace 98 is the low data output, and trace 100 is the emulated write current to the write head 18.

Figure 4:
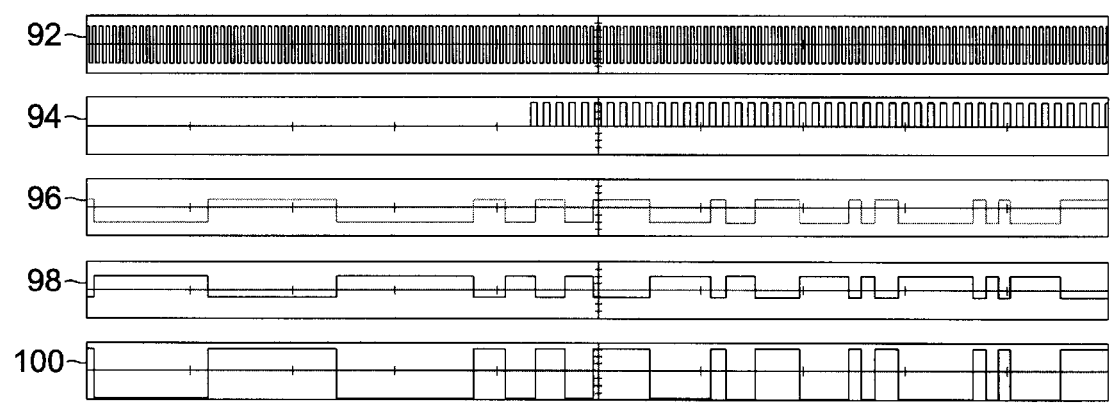
FIG. 4 is a timing diagram from an oscilloscope of various equalization circuit nodes, showing a differential output signal, with no write equalization.

FIG. 4 is a timing diagram from an oscilloscope of various equalization circuit nodes, showing a differential output signal, with no write equalization in which trace 92 is the system or wreq-clock, trace 94 is the bit-clock, trace 96 is the high data output, trace 98 is the low data output, and trace 100 is the emulated write current to the write head 18.

Figure 5:
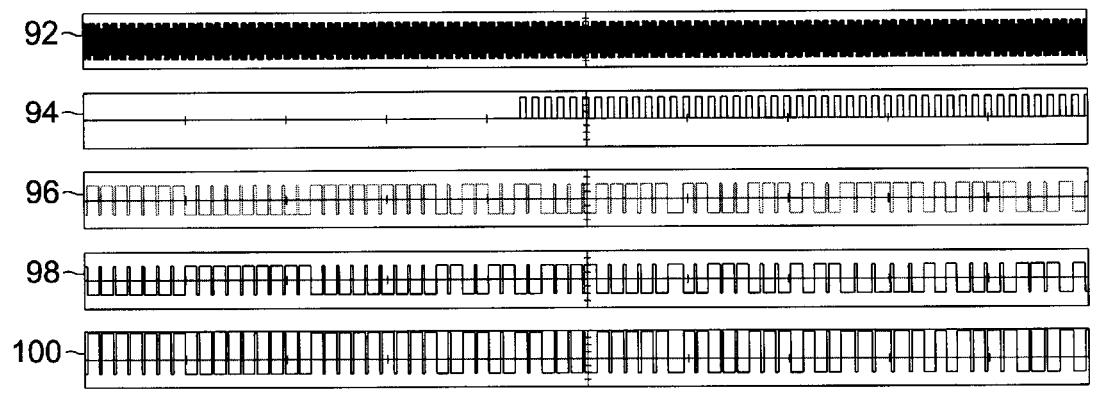
FIG. 5 is a timing diagram from an oscilloscope of various equalization circuit nodes, showing a differential output signal, with write equalization and a clock ratio of six.

FIG. 5 is a timing diagram from an oscilloscope of various equalization circuit nodes, showing a differential output signal, with write equalization and a clock ratio of six in which trace 92 is the system or wreq-clock, trace 94 is the bit-clock, trace 96 is the high data output, trace 98 is the low data output, and trace 100 is the emulated write current to the write head 18.

Figure 6:
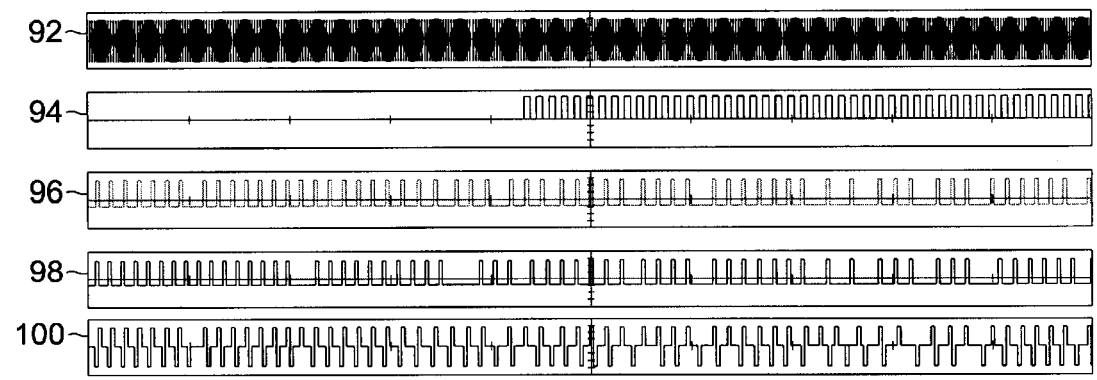
FIG. 6 is a timing diagram from an oscilloscope of various equalization circuit nodes, showing a pulsed output signal, with write equalization and a clock ratio of four.

FIG. 6 is a timing diagram from an oscilloscope of various equalization circuit nodes, showing a pulsed output signal, with write equalization and a clock ratio of four in which trace 92 is the system or wreq-clock, trace 94 is the bit-clock, trace 96 is the high data output, trace 98 is the low data output, and trace 100 is the emulated write current to the write head 18.

Figure 7:
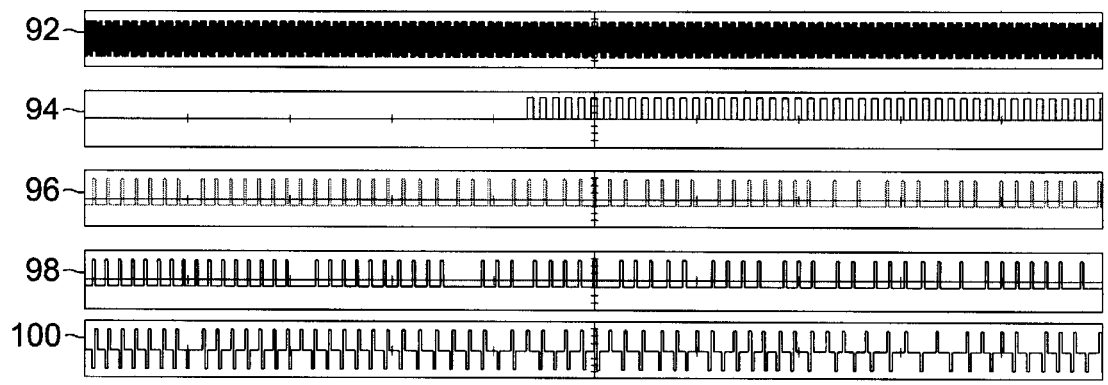
FIG. 7 is a timing diagram from an oscilloscope of various equalization circuit nodes, showing a pulsed output signal, with write equalization and a clock ratio of six.

FIG. 7 is a timing diagram from an oscilloscope of various equalization circuit nodes, showing a pulsed output signal, with write equalization and a clock ratio of six in which trace 92 is the system or wreq-clock, trace 94 is the bit-clock, trace 96 is the high data output, trace 98 is the low data output, and trace 100 is the emulated write current to the write head 18.

Figure 8:
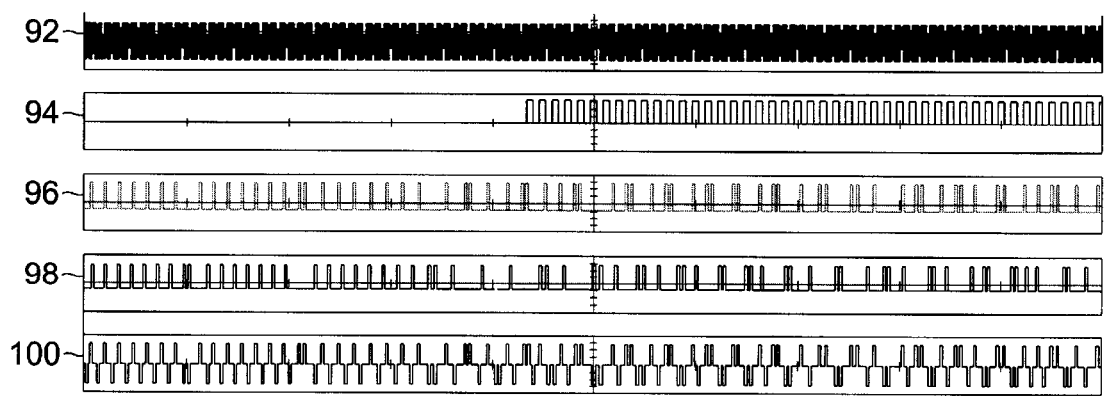
FIG. 8 is a timing diagram from an oscilloscope of various equalization circuit nodes, showing a double-pulsed output signal, with write equalization and a clock ratio of five.

FIG. 8 is a timing diagram from an oscilloscope of various equalization circuit nodes, showing a double-pulsed output signal, with spaced write equalization and a clock ratio of five in which trace 92 is the system or wreq-clock, trace 94 is the bit-clock, trace 96 is the high data output, trace 98 is the low data output, and trace 100 is the emulated write current to the write head 18.

Having described and illustrated the principle of the invention in a preferred embodiment thereof, it is appreciated by those having skill in the art that the invention can be modified in arrangement and detail without departing from such principles. For example, ratio N can be varied such that for each input data indicated by bit-clock 48, 2–8 output periods can occur on each output signal 78 and 80. The lookup-up table 60 can be reprogrammed to output $4 \times 2^N$ sequence variants, based on the ratio N. (For example, if N=8 there are 1024 possibilities that can be programmed into look-up table 60.) The size of look-up table 60 can in turn be adjusted to allow more possibilities, which would also require a change in the size/possibilities of N. I therefore claim all modifications and variations coming within the spirit and scope of the following claims.

We claim:

1. A programmable write equalization circuit comprising:
   a look-up table for receiving input data and first and second outputs;
   a first shift register having an input coupled to the flat look-up table output and an output for providing a first output data sequence;
   a second shift register having an input coupled to the second look-up table output and an output for providing a second output data sequence;
   a first equalization circuit output;
   a second equalization circuit output; and
   output means including:
      means for coupling the first shift register output to either or both of the first and second equalization circuit outputs; and
      means for coupling the second shift register output to either or both of the first and second equalization circuit output.

2. A programmable write equalization circuit as in claim 1 further comprising a counter having an input for receiving a frequency multiplied reference clock signal and a first output coupled to the first shift register and a second output coupled to the second shift register.

3. A programmable write equalization circuit as in claim 2 in which the frequency multiplied reference clock signal has a frequency of N times the reference clock signal, wherein N is an integer greater than or equal to two, and less than or equal to eight.

4. A programmable write equalization circuit as in claim 1 further comprising an NRZ filter circuit.

5. A programmable write equalization circuit as in claim 4 in which the NRZ filter circuit comprises:
   an NRZ filter having an input for receiving the input data and an output;
   a first multiplexer having a first input for receiving the input data and a second input coupled to the output of the NRZ filter, and an output coupled to the look-up table; and
   a second multiplexer having a first input for receiving the input data and a second input coupled to the output of the NRZ filter, and an output coupled to the output means.

6. A programmable write equalization circuit as in claim 5 in which the first and second multiplexer each further comprise a switching input for receiving an NRZ enable control signal.

7. A programmable write equalization circuit as in claim 4 further comprising a polarity detect circuit having an input coupled to the NRZ circuit and an output coupled to the output means.

8. A programmable write equalization circuit as in claim 1 in which the output means comprises:
   a first multiplexer having a first input coupled to the first shift register, a second input coupled to the second shift register, and an output forming the first equalization circuit output;
   a second multiplexer having a first input coupled to the first shift register, a second input coupled to the second shift register, and an output; and
   a third multiplexer having a first input coupled to the output of the second multiplexer, a second input for receiving a logic zero signal, and an output forming the second equalization circuit output.

9. A programmable write equalization circuit as in claim 8 in which the first and second multiplexers further comprise a switching input for receiving a control signal.

10. A programmable write equalization circuit as in claim 8 in which the third multiplexer further comprises a switching input for receiving a single-ended mode control signal.

11. A programmable write equalization circuit for use in a magnetic data store system comprising;
    a look-up table for receiving input data;
    a first shift register coupled to the look-up table for providing a first output data sequence;
    a second shift register coupled to the look-up table for providing a second output data sequence;
    a first equalization circuit output;
    a second equalization circuit output; and
    output means for selectively switching the first data sequence and the second data sequence between the first and second equalization circuit outputs.

12. A programmable write equalization circuit as in claim 11 further comprising a counter for receiving a frequency multiplied reference clock signal and for providing a reload signal to the first and second shift registers.

13. A programmable write equalization circuit as in claim 12 in which the frequency multiplied reference clock signal has a frequency of N times a system reference clock signal, wherein N is an integer greater than or equal to two, and less than or equal to eight.

14. A programmable write equalization circuit as in claim 11 further comprising an NRZ filter circuit.

15. A programmable write equalization circuit as in claim 14 in which the NRZ filter circuit comprises:
    an NRZ filter for receiving the input data and for providing transition-detected data;
    a first multiplexer for receiving the input data and the transition-detected data coupled to the look-up table; and
    a second multiplexer for receiving the input data and the transition-detected data coupled to the output means.

16. A programmable write equalization circuit as in claim 15 in which the first and second multiplexer each further comprise a switching input for receiving an NRZ enable control signal.

17. A programmable write equalization circuit as in claim 14 further comprising a polarity detect circuit coupled between the NBZ circuit and the output means.

18. A programmable write equalization circuit as in claim 11 in which the output means comprises:
    a first multiplexer for receiving the first and second output data sequences coupled to the first equalization circuit output; and
    a second multiplexer for receiving the first and second output data sequences coupled to the second equalization circuit output.

19. A programmable write equalization circuit as in claim 18 in which the first and second multiplexers further comprise a switching input for receiving a control signal.

20. A programmable write equalization circuit as in claim 18 in further comprising a third multiplexer interposed between the second multiplexer and the second equalization circuit output.

21. A programmable write equalization circuit as in claim 20 in which the third multiplexer further comprises a switching input for receiving a single-ended mode control signal.

22. A programmable write equalization method comprising:

generating a first output data sequence having a granularity N times greater than a system clock signal, wherein N is an integer greater than one;

generating a second output data sequence having a granularity N times greater than the system clock signal; and generating first and second system output data sequences, wherein each of the first and second system output data sequences is equal to either the first output data sequence, or the second output data sequence, the first and second system output data sequences forming a write current signal comprising a single-ended output signal, a differential output signal, a pulsed-mode output signal, or a double-pulsed output signal.

* * * * *

UNITED STATES PATENT AND TRADEMARK OFFICE
CERTIFICATE OF CORRECTION

PATENT NO. : 6,831,797 B2
DATED : December 14, 2004
INVENTOR(S) : Justin J. Koller It is certified that error appears in the above-identified patent and that said Letters Patent is hereby corrected as shown below:

Title page,
Item [22], Filed, please replace "Sep. 13, 2001" with -- Sep. 14, 2001 --.

Column 5,
Line 14, please replace "coupled to the flat look-up table" with -- coupled to be the first look-up table --.

Column 6,
Line 51, please replace "the NBZ circuit" with -- the NRZ circuit --.

Signed and Sealed this

Sixth Day of September, 2005

JON W. DUDAS
*Director of the United States Patent and Trademark Office*